Patented Oct. 22, 1929

1,732,516

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA

ODORIZED GAS PRODUCTION

No Drawing.   Application filed July 16, 1926.   Serial No. 123,024.

In the manufacture and distribution of gas for heating, lighting, etc., it is of advantage to introduce into the gas an odorant having a persistent and penetrating odor so that timely warning will be given the consumer in case of leakage. It is also desirable that such warning odorant should not contain compounds of sulphur or similar metalloids because of the corrosive oxidation products which form in the burning of such odorants in the normal combustion of the gas. It is also of great advantage to provide an odorant that will give the same products on burning as are produced by burning the gas itself, that is, carbon dioxide and water, with possibly some carbon monoxide.

In a number of copending cases including my copending application Serial No. 272,567, filed January 22, 1919, and Serial No. 435,355, filed January 6, 1921, I have described a vapor phase catalytic process for the preparation of intermediate oxidation products from aliphatic and naphthenic hydrocarbons. In said process the liquid hydrocarbon is vaporized, mixed with air in regulated proportions, and the heated mixture is passed over a catalyst preferably consisting of the oxides or compounds of vanadium or molybdenum or metals of like character. The temperature in such processes has usually been between 170° and 500° C. Steam may or may not be used as a diluent. One or more catalytic screens may be used and if a plurality is used air may be added between screens. The condensed product contained a large number of oxidized and hydroxylated compounds extending from alcohols to aldehydic and hydroxylated acids and including lactones, ketones, aldehydes, etc. of different molecular weights.

In the various modifications of such process there is always produced along with liquid condensed products of oxidation certain gaseous products and highly volatile liquid products. These contain a similar percentage of ill-smelling compounds which are penetrating and persistent. Such compounds consist largely of unsaturated hydrocarbons which are formed in the thermal decomposition of the oxidized bodies in the catalytic apparatus, aldehydes, such as formaldehyde, acetaldehyde and acrolein, as well as unsaturated alcohols of low molecular weight though usually of greater molecular weight than ethyl alcohol. The exit gases also contain carbon dioxide and carbon monoxide, and in addition contain nitrogen where the oxidation is carried out with air, together with some free oxygen. This gas is incidental to the preparation of liquid condensed oxidation products but does not form a large percentage of the total products of oxidation when the process is carried out as described in said foregoing applications.

In the production of an odorant for gas supplies, I preferably modify the process by using a higher temperature in the catalytic converter than would be good practice where a good yield of liquid oxidation products is desired. In this way whether I employ air as the oxygen carrier, or use pure oxygen, I can reduce the oxygen in the exit gas to a small fraction of 1%, low enough to remove all danger, especially as only a relatively small amount of the odorant is required in gas supply. Where molybdenum oxide is employed as a catalyst in the oxidation of hydrocarbon oils, the temperature has usually been from 200° or 225° to about 425° C. In obtaining my odorant gas I preferably raise this to a temperature of from 450° C. to 550° C. and thus increase the gas yield, reduce the oxygen in the exit gas and of course also reduce the amount of condensate.

When it is disadvantageous to introduce into a gas supply the nitrogen that would naturally accompany the gas produced by my process when air is used as the oxygen carrier, I may use pure oxygen in place of air and dilute the vapor gas stream with passing into the catalyst with steam to insure against explosions.

In the above way I can increase the gas yield in one operation of the process from 5% to 40%. The resulting oily condensed products can be mixed with fresh oil and rerun through the apparatus or another similar apparatus so that substantially all of a given batch of oil can be converted into a highly odoriferous gas. This gas may be mixed in small proportions with the gas supply by any suitable measuring device to give the proper percentages for warning of leakage. In using said gas it is better to remove the carbon dioxide by a lime water scrubbing operation which will also serve to remove the free acids, such as formic and acetic acids, from the gas.

One example of a gas made as above described by "air" partial oxidation, after carbon dioxide removal, gave the following analysis:

| | Per cent |
|---|---|
| Carbon monoxide | 5.1 |
| Odorant components, such as aldehydes, unsaturated hydrocarbons, etc. | 2.6 |
| Nitrogen | 92.1 |
| Oxygen | .2 |

Where it is desirable to eliminate the nitrogen, pure oxygen may be used with steam as the diluent; or as set forth in another copending application, Serial No. 81,963, filed January 18, 1926, the oxygen may be obtained from oxides in the substantial absence of air. In this case the oxides are fed through the apparatus and oxygen extractor after which they are revivified and reused.

The raw material used in this process may be not only hydrocarbon oils, but also hydrocarbon gases or hydrocarbon-containing gases. For example, I may use as my raw material propane or butane; although methane and ethane may be used in special cases. Many variations may be made in the partial oxidation process, the catalyst may be varied, or done away with, the temperature may be changed, and other variations may be made without departing from my invention.

I claim:

1. As a new article of manufacture, combustible gas containing an odorant gas produced by synthetic partial oxidation of aliphatic hydrocarbons in the vapor or gaseous phase.

2. As a new article of manufacture, combustible gas containing an odorant gas having a content of aliphatic aldehyde-like bodies.

3. In the process of odorizing combustible gas, the step consisting in mixing therewith another gas having a persistent odor and produced by gaseous or vapor phase oxidation of aliphatic hydrocarbons.

4. In the process of odorizing combustible gas, the step consisting in mixing therewith another gas having a persistent odor and produced by gaseous or vapor phase oxidation of aliphatic hydrocarbons, said gas containing aldehyde-like bodies.

5. As a new article of manufacture, combustible gas containing an odorant gas produced by gaseous or vapor phase oxidation of an aliphatic hydrocarbon, and containing oxygen derivatives of aliphatic hydrocarbons.

In testimony whereof I have hereunto set my hand.

JOSEPH HIDY JAMES.